(12) United States Patent
Kaippallimalil

(10) Patent No.: US 7,649,888 B2
(45) Date of Patent: Jan. 19, 2010

(54) SYSTEM FOR LINK INDEPENDENT MULTI-HOMING IN HETEROGENEOUS ACCESS NETWORKS

(75) Inventor: John Kaippallimalil, Richardson, TX (US)

(73) Assignee: Futurewei Technologies, Inc., Plano, TX (US)

(*) Notice: Subject to any disclaimer, the term of this patent is extended or adjusted under 35 U.S.C. 154(b) by 291 days.

(21) Appl. No.: 11/777,896

(22) Filed: Jul. 13, 2007

(65) Prior Publication Data

US 2008/0013556 A1    Jan. 17, 2008

Related U.S. Application Data

(60) Provisional application No. 60/807,431, filed on Jul. 14, 2006.

(51) Int. Cl.
H04L 12/28 (2006.01)
H04L 12/56 (2006.01)
H04W 4/00 (2006.01)

(52) U.S. Cl. ........................ 370/392; 370/328

(58) Field of Classification Search ............... 370/328, 370/389, 392
See application file for complete search history.

(56) References Cited

U.S. PATENT DOCUMENTS

2002/0034298 A1* 3/2002 Gallagher et al. ......... 380/247
2006/0133316 A1* 6/2006 Jagana et al. ............. 370/331
2006/0153235 A1* 7/2006 Kiernan et al. ............ 370/469

OTHER PUBLICATIONS

Chang, Gee-Kung, et al., "Novel Optical-Wireless Access Network Architecture for Simultaneously Providing Broadband Wireless and Wired Services," Georgia Institute of Technology, 2006, 3 pages.
IEEE P802.21/D00.05, "Draft IEEE Standard for Local and Metropolitan Area Networks: Media Independent Handover Services," Media Independent Handover Services, Jan. 2006, 169 pages.
Kuladinithi, K., et al., "Filters for Mobile IPv6 Bindings (NOMADv6) draft-nomadv6-mobileip-filters-03.txt," The Internet Society, MIP6 Working Group, Internet Draft, http://www.tools.ietf.org/html/draft-nomadv6-mobileip-filters-03, Oct. 2005, 25 pages.
IETF Working Group Charter, "Mobility for IPv6 (mip6)," http://www.ietf.org/proceedings/05mar/mip6.html, Jan. 17, 2005, 10 pages.
IETF Working Group Charter, "Mobile Nodes and Multiple Interfaces in IPv6 (monami6)," http://www.ietf.org/proceedings/06jul/monami6.html, Apr. 26, 2006, 3 pages.

* cited by examiner

*Primary Examiner*—Ronald Abelson
(74) *Attorney, Agent, or Firm*—Conley Rose, P.C.; Grant Rodolph

(57) ABSTRACT

A system for link-independent multihoming in a network having heterogeneous access network technologies is disclosed, providing such multihoming in a manner transparent to IP connections. The system of the present invention provides constructs and methods for:
discovering and selecting a multihoming server; selecting a primary media access control (MAC) address; associating multiple link addresses with a MAC address; and forwarding packets via the multihoming server based on certain defined policies.

17 Claims, 1 Drawing Sheet

SYSTEM FOR LINK INDEPENDENT MULTI-HOMING IN HETEROGENEOUS ACCESS NETWORKS

PRIORITY CLAIM

This application claims the priority benefit of U.S. Provisional Application No. 60/807,431, filed Jul. 14, 2006.

TECHNICAL FIELD OF THE INVENTION

The present invention relates generally to telecommunications systems and, more particularly, to a system for link independent multihoming in heterogeneous access networks.

BACKGROUND OF THE INVENTION

Emerging communications technologies and applications—such voice over Internet protocol (VoIP), full-motion video and wireless teleconferencing—have various quality of service (QoS) requirements (e.g., bandwidth) that are far greater than the capabilities of many existing third-generation (3G) technologies. A number of current and emerging technologies attempt to address needs such as greater bandwidth requirements—including, for example, ultra wideband, hotspot, and other variations that have relatively short ranges, in order to support high bandwidth. Commonly, such networks are also characterized by multiple technologies implemented in a single domain in order to address various needs efficiently.

Within such networks, the need for roaming between domains during the course of a communications session and, correspondingly, handovers between various access technologies becomes critical, due to characteristics of each access network implemented (e.g., long sessions, short range access, mobility, etc.). The access technologies that are commonly implemented in many office and home networks may not have ubiquitous coverage of an entire area that users move across during the course of a communications session. However, an end user needs to be able to move between these networks in a manner that is transparent to the application.

As it became more common to use communications networks in mobile environments, the concept of multihoming was developed to help solve problems associated with migrating between different types of networks while traveling. Multihoming is commonly associated with the configuration of multiple network connections on a single end user device (e.g., a computer). Conventional multihoming is intended to increase the reliability of network access, but does not necessarily improve application performance.

In some conventional multihoming applications, at least two hardware network adapters or interface units are provided with or added to an end user device (e.g., a computer). Both adapters are then configured to utilize a single local network interface (i.e., IP address). Such a configuration allows the end user device to continue using a network even if one or the other network adapter stops functioning. In some cases, the adapters may be connected to different Internet/network access points to increase the total bandwidth for use across multiple applications. Some alternate forms of multihoming assign multiple IP addresses to a single adapter on one end user device; some use various combinations of the above.

In most conventional IP multihoming systems, assignment of IP address(es) is done at the network layers (i.e., L1[PHY] or L2[Link]). Each unique type of network in a system will generally have its own unique syntax for communications and establishment of IP addresses. As an end user terminal or device is mobile—and moving between various types of networks—its adapter will require rediscovery and readdressing by each such network. Thus, conventional IP multihoming schemes can be relatively complicated and overhead intensive, as the adapter is tasked with establishing interface with various networks and their unique syntaxes.

As a result, there is a need to provide network (i.e., Link) independent multihoming in heterogeneous access networks—providing reliable handovers between various access networks, and reliable connections when no single access network is capable of full or extended coverage.

SUMMARY OF THE INVENTION

The present invention provides a system, comprising various methods and apparatus, for providing simple and efficient network independent multihoming in heterogeneous access networks. The present invention provides multihoming utilizing addressing at a layer that is independent of unique access network syntaxes; instead utilizing an interoperable, "universal" syntax or semantics (e.g., XML). The present invention thus addresses bandwidth and performance optimization—as well as other issues—for networks comprising multiple heterogeneous access technologies.

Certain embodiments of the present invention provide for discovering and selecting a multihoming server, selecting media access control (MAC) addresses, associating multiple link addresses with MAC addresses, and forwarding packets by the multihoming server based on policies.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
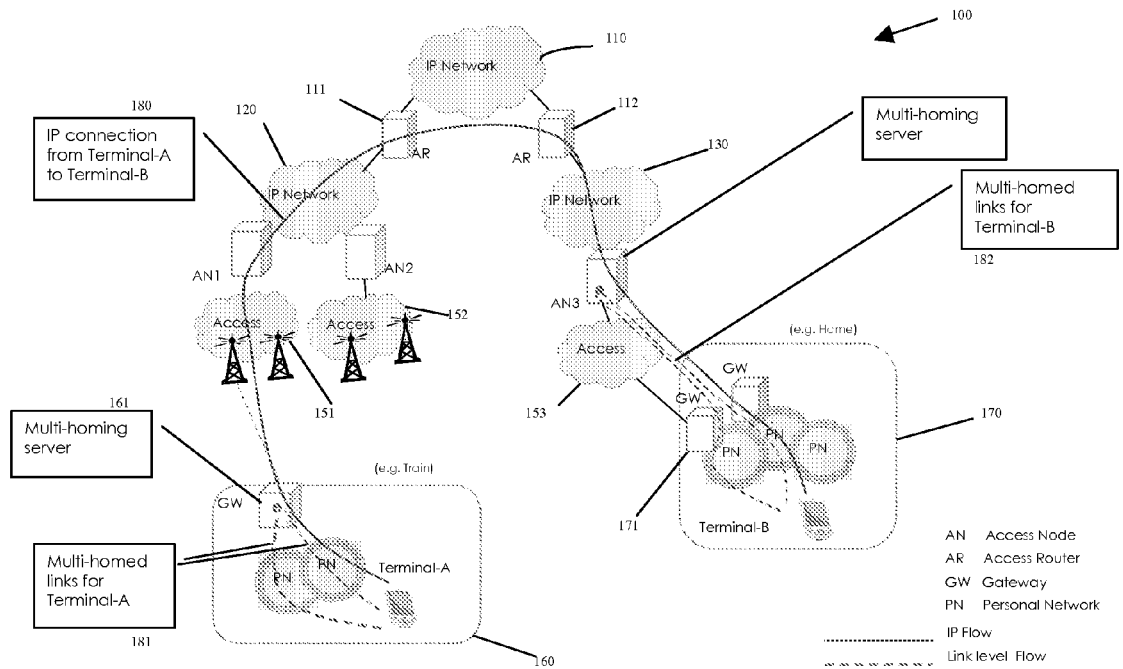
FIG. 1 is a diagram depicting an illustrative network structure according to the present invention.

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides a system, comprising various methods and apparatus, for providing simple and efficient network independent multihoming in heterogeneous access networks—in a manner transparent to a network/adapter interface (i.e., an IP connection). The present invention provides multihoming utilizing addressing at a layer that is independent of unique access network syntaxes; instead utilizing an interoperable, "universal" syntax (e.g., XML).

At present, there appears to be a significant amount of standardization related to multihoming (e.g., IETF multihoming, IEEE 802.21). Conventional systems tend to focus on providing multi-homing at an IP subnet level (e.g., link layer). Such an approach may be suitable for networks where access points are homogeneous, and multi-homing at the link layer is addressed within the scope of a single link technology. This approach is—as networks become more disparate and diverse—growing increasingly limited in its efficiency. Some conventional efforts are attempting to address multihoming in heterogeneous networks. For example, IEEE 802.21 is developing some solutions to address handovers in between access networks in a technology independent manner. The need for reliable connections does not, however, appear to be adequately addressed in the context of multi-technology access networks. Furthermore, permitting or requiring a constant interface connection with a high level of mobility between access networks remains problematic. Conventional approaches (e.g., IEEE 802.21) appear to have not previously focused on such problems, since their primary goal was generally basic (inter-technology) mobility.

In contrast to conventional approaches, the system of the present invention does address the optimization of system performance and efficiency; and may be implemented in any suitable access network component (e.g., access node (AN) products, access router (AR) products). The present invention addresses optimization and other issues for networks with multiple heterogeneous access technologies, and includes a link independent multi-homing method. The multihoming method provides for discovering and selecting a multi-homing server, selecting media access control (MAC) addresses, associating multiple link addresses with MAC addresses, and forwarding packets by a multi-homing server based on predetermined policies. Each individual access link technology does not have to be ubiquitous. In addition, the present invention may be utilized to enhance existing IEEE 802.21 handover operations, using the disclosed multi-homing system. The system of the present invention further reduces overall system costs by optimizing reliability and simplifying each link technology instance. Adaptive applications may also benefit from the combined throughput of links (i.e., load balancing) utilizing the present system.

The present invention utilizes link independent multi-homing as a solution to remaining connected for extended time sessions when multiple short-range access technologies are present. Multihoming is generally related to link connections, since it usually involves homing in over more than one link for a single connection (i.e., IP address). The system of the present invention is, however, independent of any single access/link technology, and provides a solution for moving between links of different access technologies.

As previously discussed, multihoming provides the ability to associate two (or more) links, and associate (i.e., home) them to one connection, from an IP network perspective. This capability enables a multihoming server to forward packets based on predetermined or user-defined policies. The present invention goes beyond existing standards, such as IEEE 802.21, to provide multihoming syntax (or semantics) for: discovery of multihoming-capable servers; link address association; homing policy handling; and forwarding based on homing policies.

Referring now to FIG. 1, an illustration of a basic network system 100, according to certain principles of the present invention, is depicted. System 100 comprises an IP network access server (e.g., an AR), represented by AR 111 and 112, which connect IP networks 110, 120 and 130. This aggregation of networks between AN1, AN2, AN3 and AR 111 and AR 112 is IP-based. As such, the ANs can "snoop" and forward IP packets.

Access networks 151, 152 and 153 utilize various L2 (Layer 2) technologies—such as worldwide interoperability for microwave access (WiMAX), example digital subscriber line (xDSL), cellular and other technologies. User terminal-A 160 and user terminal-B 170 have multiple radio capabilities (not shown), multiple network terminations (not shown), and connect to access networks 151 and 153, respectively, via a home network, a commercial network, or some other personal network (PN). These networks communicate with the access networks through gateway (GW) 161, for Terminal-A 160, and GW 171, for Terminal-B 170, respectively.

Various communication flows are illustrated in FIG. 1 by flow lines. An IP connection flow 180 (i.e., solid line) extends between terminal-A 160 and terminal-B 170. This IP connection is unaware of link level multihoming. Each of the terminals in FIG. 1 is capable of host based, link-independent multihoming that is disclosed and contemplated by the present invention.

This is depicted in FIG. 1 by two link connections 181 and 182 (i.e., dashed lines) to link layer nodes (i.e., GW, AN). Link 181 links terminal-A 160 to GW 161, and link 182 links terminal-B 170 to AN3. The terminals may thereby accomplish redundancy or connection load balancing in a technology independent manner that is transparent to the IP layer. Moreover, the network and terminal negotiate to use a 'closest' node for multihoming purposes. In FIG. 1, GW 161 is the closest node, with multihoming capability, for terminal-A 160. For terminal-B 170, AN3 is the closest. A 'closest' node may be defined as a node topologically closest to a given terminal that is capable of handling multihoming functions—such as, but not limited to, discovery, link address association, homing policy handling, and forwarding based on policy.

Figure 2:
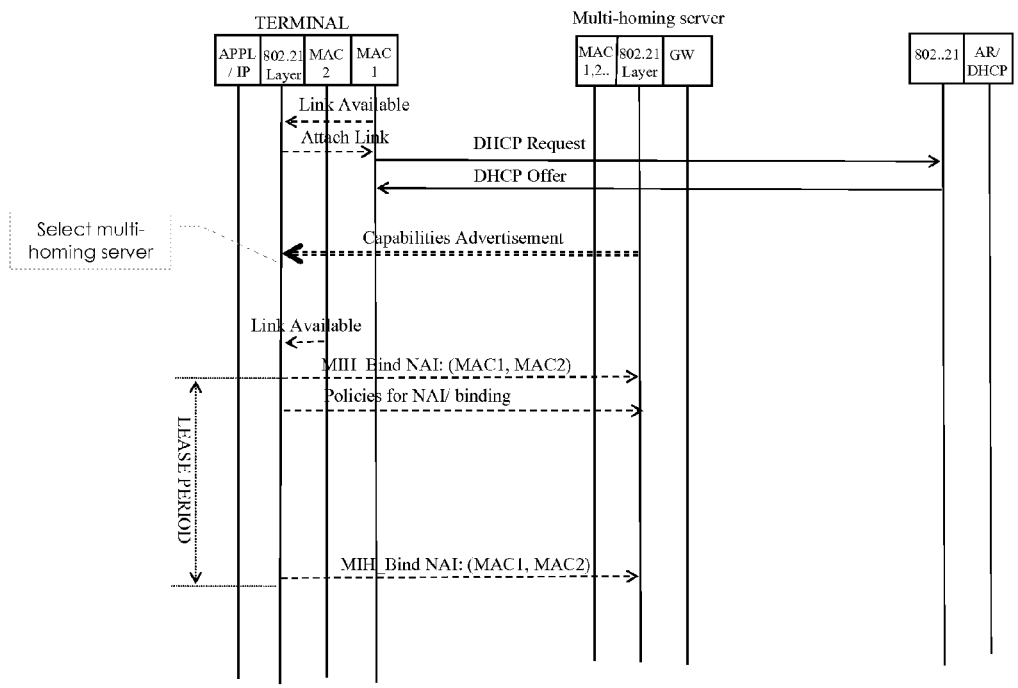
FIG. 2 is a diagram depicting an illustration of communication sequences of the network in FIG. 1, according to the present invention.

Referring now to FIG. 2, an illustration of various aspects of communication sequences of network 100 is presented—including illustration of how normal sequences of communications in network 100 are executed. A terminal (e.g., terminal-A 160) obtains an IP address (e.g., IPv-6-internet protocol version 6, or IPv4-internet protocol version 4) from network access services (NAS) when it enters a subnet. In FIG. 2, this is depicted by sequence Link Available/Attach Link/DHCP Request/DHCP Response; where DHCP indicates dynamic host configuration protocol.

The terminal discovers a 'closest' multihoming server, and transmits its unique network access identifier (NAI) to the multihoming server. In certain embodiments, for example, IEEE 802.21 Capabilities Advertisement/Capability Discovery Request-Response may be extended and utilized accordingly. The terminal then associates MAC addresses with its unique identifier (i.e., NAI), and reports to the multihoming server. The terminal may declare one MAC address as the "primary" MAC address. In certain embodiments, for example, IEEE 802.21 may be extended and utilized. In FIG. 2, this is represented by MIH_Bind sequence. The multihoming server then determines MAC/IPv6 address binding during IPv6 neighbor discovery, and MAC/IPv4 address binding during the IPv4 ARP sequence.

The terminal notifies the multihoming server of one or more predetermined or user-defined policies that it must use to process packets for that terminal. Utilizing these policies, the server may select link(s) via which packets may be sent. Period (i.e., time interval) of association for multihoming is based on a "lease" time. This length of time may be dependent on a particular access technology or frequency of mobility. The lease needs to be renewed to continue the association.

The present invention provides a number of functional structures and capabilities for implementing link independent multihoming. Discovery and selection of a multihoming server begins with a terminal (host) listening or monitoring for "capability advertisement." For example, in IEEE 802.21, handover advertisement may be extended to include advertising multihoming capabilities. Alternatively, a terminal can trigger a capabilities discovery message. For example, a terminal may trigger IEEE 802.21 Capability_Discovery_Request/Response message sequences—provided that such messages are similarly extended to support multihoming information. The terminal may then potentially receive multiple advertisements or discovery responses from multihoming servers.

The terminal may then collect path information for each based upon advertisements or discovery responses. This path information would provide the terminal with some indication of the topological or physical location of a responding component (i.e., server) in relation to the terminal. The terminal then selects a 'closest' server from advertisements or discovery responses received over multiple paths. A primary MAC address is selected from a list of active links for the terminal. A primary MAC may be selected by predetermined configuration of the terminal—to select the link with the greatest coverage area, for example—or the terminal may adaptively develop or learn this information based upon, for example, usage patterns. Additionally, the terminal may pick a MAC at random and designate it as the primary MAC.

When a terminal moves and loses its previously designated primary MAC, it selects a new primary MAC address. The primary MAC is associated via the IPv4 ARP (address resolution protocol) or IPv6 neighbor discovery. Association of multiple link addresses binds the NAI with MAC addresses. For example, associating multiple link addresses may be provided in the format of: MIH_Bind (NAI, [list of MAC addresses], flags), where the flags indicate which action (bind or unbind) is to be executed.

In addition, policy based mechanisms may be provided to associate filters with the binding or association operations. A filter may be associated with an NAI in a binding (MIH), for example. In conjunction with the multihoming described above, filters may be utilized to direct a multihoming server to forward packets based on a given set of policies. For example, a policy set may provide the following filters or directions to a server: 1) duplicate and forward on all links if link availability (i.e., signal strength) is not accessible or sub-par; 2) load balance between available links if throughput required exceeds that of a single link; and 3) select link based upon lowest route cost when signal strength is acceptable. These policies and filters may be predefined and provided by a terminal manufacturer, may be user-defined, or some combination of both—depending upon the type of terminal device and communications system.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing multihoming to a terminal, in a communications system having heterogeneous access network technologies, comprising the steps of:

obtaining an IP address from network access services for the terminal when it enters a subnet;

determining a multihoming server closest to the terminal, wherein the step of determining a multihoming server closest to the terminal further comprises the steps of:

retrieving, by the terminal, responding multihoming server capability information;

providing the terminal with some indication of location of a responding multihoming server in relation to the terminal; and selecting, based upon the retrieved multihoming server capability information and the location information, a multihoming server;

transmitting a unique network access identifier from the terminal to the multihoming server;

associating a media access control address with the unique network access identifier; and reporting the associated media access control address and unique network access identifier to the multihoming server.

2. The method of claim 1, wherein the terminal is a mobile station.

3. The method of claim 1, wherein the terminal is a computer.

4. The method of claim 1, wherein the communications system having heterogeneous access network technologies is based upon IEEE 802.21.

5. The method of claim 1, wherein the step of retrieving, by the terminal, responding multihoming server capability information further comprises monitoring for capability advertisement.

6. The method of claim 1, wherein the step of retrieving, by the terminal, responding multihoming server capability information further comprises triggering a capabilities discovery message.

7. The method of claim 1, further comprising the step of selecting a primary media access control address.

8. The method of claim 7, wherein the step of selecting the primary media access control address is accomplished via predetermined configuration of a terminal.

9. The method of claim 7, wherein the step of selecting the primary media access control address is accomplished via adaptive development.

10. A mobile communications device, adapted to utilize multihoming in a communications system having heterogeneous access network technologies, comprising:

means for obtaining an IP address from network access services for the terminal when it enters a subnet;

means for determining a multihoming server closest to the terminal, wherein the means for determining a multihoming server closest to the terminal further comprises:

means for retrieving responding multihoming server capability information;

means for providing the terminal with some indication of location of a responding multihoming server in relation to the terminal; and means for selecting, based upon the retrieved multihoming server capability information and the location information, a multihoming server;

means for transmitting a unique network access identifier from the terminal to the multihoming server;

means for associating a media access control address with the unique network access identifier; and means for reporting the associated media access control address and unique network access identifier to the multihoming server.

11. The device of claim 10, wherein the terminal is a mobile station.

12. The device of claim 10, wherein the terminal is a computer.

13. The device of claim 10, wherein the communications system having heterogeneous access network technologies is based upon IEEE 802.21.

14. The device of claim 10, wherein the means for retrieving, responding multihoming server capability information further comprises means for monitoring for capability advertisement.

15. The device of claim 10, wherein the means for retrieving responding multihoming server capability information further comprises means for triggering a capabilities discovery message.

16. The device of claim 10, further comprising means for selecting a primary media access control address.

17. A method of providing multihoming to a mobile terminal, in a wireless communications system having heterogeneous access network technologies, comprising the steps of:

obtaining an IP address from network access services for the terminal when it enters a subnet;

retrieving, by the terminal, responding multihoming server capability information;

providing the terminal with some indication of location of a responding multihoming server in relation to the terminal;

selecting a multihoming server based upon the retrieved multihoming server capability information and the location information;

transmitting a unique network access identifier from the terminal to the multihoming server;

associating a media access control address with the unique network access identifier;

associating a policy filter with the unique network access identifier; and reporting the associated media access control address and unique network access identifier to the multihoming server.

* * * * *

UNITED STATES PATENT AND TRADEMARK OFFICE
CERTIFICATE OF CORRECTION

PATENT NO. : 7,649,888 B2  Page 1 of 1
APPLICATION NO. : 11/777896
DATED : January 19, 2010
INVENTOR(S) : Kaippallimalil It is certified that error appears in the above-identified patent and that said Letters Patent is hereby corrected as shown below:

Col 6, line 53, Claim 10, line 9, after "means for retrieving" insert a --,--.

Signed and Sealed this

Twentieth Day of April, 2010

David J. Kappos
*Director of the United States Patent and Trademark Office*